US012713034B2

(12) United States Patent
Yoo et al.

(10) Patent No.: US 12,713,034 B2
(45) Date of Patent: Aug. 18, 2026

(54) IMAGE DECODING METHOD AND APPARATUS THEREFOR

(71) Applicant: LG Electronics Inc., Seoul (KR)

(72) Inventors: Sunmi Yoo, Seoul (KR); Jungah Choi, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/703,583

(22) PCT Filed: Oct. 18, 2022

(86) PCT No.: PCT/KR2022/015825

§ 371 (c)(1),
(2) Date: Apr. 22, 2024

(87) PCT Pub. No.: WO2023/068731

PCT Pub. Date: Apr. 27, 2023

(65) Prior Publication Data

US 2025/0008111 A1 Jan. 2, 2025

(30) Foreign Application Priority Data

Oct. 22, 2021 (KR) ........................ 10-2021-0141839

(51) Int. Cl.
*H04N 19/159* (2014.01)
*H04N 19/129* (2014.01)
(Continued)

(52) U.S. Cl.
CPC ......... *H04N 19/159* (2014.11); *H04N 19/129* (2014.11); *H04N 19/172* (2014.11);
(Continued)

(58) Field of Classification Search
None
See application file for complete search history.

(56) References Cited

U.S. PATENT DOCUMENTS

2013/0016773 A1* 1/2013 Oh ........................ H04N 19/91 375/240.03
2013/0022122 A1* 1/2013 Oh ...................... H04N 19/126 375/E7.243

(Continued)

FOREIGN PATENT DOCUMENTS

KR 10-1549912 9/2015
KR 10-2016-0093104 8/2016

(Continued)

OTHER PUBLICATIONS

International Search Report and Written Opinion in International Appln. No. PCT/KR2022/015825, mailed on Jan. 31, 2023, 6 pages (with English translation).

(Continued)

*Primary Examiner* — Mohammad J Rahman
(74) *Attorney, Agent, or Firm* — Fish & Richardson P.C.

(57) ABSTRACT

An image decoding method performed by a decoding apparatus, according to the present disclosure, comprises the steps of: selecting, from among residual coefficients of a current block, specific residual coefficients for sine prediction in a scan order; predicting sines for the specific residual coefficients; deriving residual samples of the current block on the basis of the predicted sines; and generating a reconstructed picture on the basis of the residual samples, wherein the scan order is derived on the basis of an intra prediction mode which has been applied to the current block.

14 Claims, 11 Drawing Sheets

(51) Int. Cl.

| | |
|---|---|
| ***H04N 19/172*** | (2014.01) |
| ***H04N 19/176*** | (2014.01) |
| ***H04N 19/593*** | (2014.01) |
| ***H04N 19/70*** | (2014.01) |

(52) U.S. Cl.

CPC ......... *H04N 19/176* (2014.11); *H04N 19/593* (2014.11); *H04N 19/70* (2014.11)

(56) References Cited

U.S. PATENT DOCUMENTS

| | | | | |
|---|---|---|---|---|
| 2017/0374369 | A1* | 12/2017 | Chuang | H04N 19/70 |
| 2018/0160114 | A1* | 6/2018 | Philippe | H04N 19/18 |
| 2018/0332285 | A1* | 11/2018 | Lee | H04N 19/122 |
| 2019/0052909 | A1* | 2/2019 | Choi | H04N 19/70 |
| 2019/0208225 | A1 | 7/2019 | Chen et al. | |
| 2020/0374560 | A1* | 11/2020 | Zhao | H04N 19/60 |
| 2021/0243445 | A1* | 8/2021 | Leleannec | H04N 19/129 |
| 2021/0352324 | A1* | 11/2021 | Zhao | H04N 19/12 |
| 2021/0385439 | A1* | 12/2021 | Zhu | H04N 19/105 |
| 2021/0385478 | A1* | 12/2021 | Yoo | H04N 19/13 |
| 2022/0030280 | A1* | 1/2022 | Zhu | H04N 19/96 |
| 2022/0038687 | A1* | 2/2022 | Zhu | H04N 19/11 |
| 2022/0046247 | A1* | 2/2022 | Yoo | H04N 19/196 |
| 2022/0046255 | A1* | 2/2022 | Zhu | H04N 19/176 |
| 2022/0070472 | A1* | 3/2022 | Yoo | H04N 19/176 |
| 2022/0417515 | A1* | 12/2022 | Chen | H04N 19/159 |
| 2023/0082092 | A1* | 3/2023 | Kang | H04N 19/60 375/240.18 |
| 2023/0319271 | A1* | 10/2023 | Lim | H04N 19/96 375/240.02 |

FOREIGN PATENT DOCUMENTS

| | | |
|---|---|---|
| KR | 10-2019-0113656 | 10/2019 |
| KR | 10-2021-0105996 | 8/2021 |
| KR | 10-2021-0115041 | 9/2021 |

OTHER PUBLICATIONS

Extended European Search Report in European Appln. No. 22883954.4, mailed on Aug. 25, 2025, 10 pages.

Lainema et al., "Intra Coding of the HEVC Standard," IEEE Transactions on Circuits and Systems for Video Technology, Dec. 2012, 22(12):1792-1801.

* cited by examiner

Input video (picture)
200 encoding apparatus
210 image partitioner
220
inter predictor (221)
intra predictor (222)
230
231 + -
232 transformer
233 quantizer
234 dequantizer
235 inverse transformer
240 entropy encoder
Bitstream
250
260 filter
270 memory
DPB reconstructed image
(picture)
300
decoding apparatus
Bitstream
entropy decoder
310
320
321
dequantizer
322
inverse transformer
340
350
filter
memory
DPB
360
330
331
intra predictor
332
inter predictor User Equipment
Game console
PC
Settop box
Smart Phone
Wired/Wireless communication
Wired/Wireless communication
Web Server
Streaming Server
Media storage
Realtime transmission
Encoding Server
Smart Phone
Camcoder/Camera

IMAGE DECODING METHOD AND APPARATUS THEREFOR

CROSS-REFERENCE TO RELATED APPLICATIONS

This application is a National Stage application under 35 U.S.C. § 371 of International Application No. PCT/KR2022/015825, filed on Oct. 18, 2022, which claims the benefit of Korean Patent Application No. 10-2021-0141839, filed on Oct. 22, 2021. The disclosures of the prior applications are incorporated by reference herein in their entirety.

TECHNICAL FIELD

This document relates to image coding technology, and more specifically, to an image decoding method and device for coding image information by predicting the sine information of the residual coefficient in an image coding system.

BACKGROUND

Recently, demand for high-resolution, high-quality video/images such as 4K or 8K or higher UHD (Ultra High Definition) videos/images is increasing in various fields. As video/image data becomes higher resolution and higher quality, the amount of information or bits transmitted increases relative to existing video/image data, when transmitting image data using media such as existing wired or wireless broadband lines or storing video/image data using existing storage media, transmission and storage costs increase.

In addition, interest in and demand for immersive media such as VR (Virtual Reality), AR (Artificial Reality) content and holograms is increasing, broadcasting of videos/images with image characteristics different from real images, such as game images, is increasing.

Accordingly, highly efficient image compression technology is required to effectively compress, transmit, store, and reproduce high-resolution, high-quality video/image information having the various characteristics described above.

SUMMARY

The present disclosure provides a method and apparatus for improving video/image coding efficiency.

Another technical task of this document is to provide a method and device for performing sign prediction for the current block.

Another technical task of this document is to provide a method and device for coding residual information of the current block to which sine prediction is applied.

According to an embodiment of this document, an image decoding method performed by a decoding device is provided. The method includes, selecting specific residual coefficients for sine prediction using scan order among the residual coefficients of the current block, predicting signs for the specific residual coefficients, deriving residual samples of the current block based on the predicted signs and generating a reconstructed picture based on the residual samples, where the scan order is characterized in that it is derived based on the intra prediction mode applied to the current block.

According to another embodiment of this document, a decoding device that performs image decoding is provided. The decoding device includes a memory and at least one processor connected to the memory, the at least one processor is configured to, select specific residual coefficients for sine prediction using scan order among the residual coefficients of the current block, predict signs for the specific residual coefficients, derive residual samples of the current block based on the predicted signs, and generate a reconstructed picture based on the residual samples, where the scan order is characterized in that it is derived based on the intra prediction mode applied to the current block.

According to another embodiment of this document, an image encoding method performed by an encoding device is provided. The method includes, selecting specific residual coefficients for sine prediction using scan order among the residual coefficients of the current block, predicting signs for the specific residual coefficients, encoding residual information of the current block including syntax elements for the predicted signs, where a target syntax element among the syntax elements indicates whether the predicted sign for the target syntax element is accurate, where the scan order is derived based on the intra prediction mode applied to the current block.

According to another embodiment of this document, an image encoding device is provided. The encoding device includes a memory and at least one processor connected to the memory, the at least one processor is configured to, select specific residual coefficients for sine prediction using scan order among the residual coefficients of the current block, predict signs for the specific residual coefficients, and encode residual information of the current block containing syntax elements for the predicted signs, where a target syntax element among the syntax elements indicates whether the predicted sign for the target syntax element is accurate, where the scan order is derived based on the intra prediction mode applied to the current block.

According to another embodiment of this document, a digital storage medium is provided. The digital storage medium can store a bitstream including residual information encoded by the image encoding method according to this document.

According to another embodiment of this document, a data transmission method for images is provided. The data transmission method includes, obtaining a bitstream of image information including residual information including syntax elements for predicted signs of specific residual coefficients of the current block, and transmitting the data including the bitstream of the image information including the residual information, where a target syntax element among the syntax elements indicates whether the predicted sign for the target syntax element is accurate, where the specific residual coefficients are selected as a scan order among the residual coefficients of the current block, where the scan order is derived based on the intra prediction mode applied to the current block.

According to another embodiment of this document, a device for data transmission about images is provided. The device includes, at least one processor to obtain a bitstream of image information including residual information including syntax elements for predicted signs of specific residual coefficients of the current block, and a transmitter transmitting the data including the bitstream of the image information including the residual information, where a target syntax element among the syntax elements indicates whether the predicted sign for the target syntax element is accurate, where the specific residual coefficients are selected as a scan order among the residual coefficients of the current block, where the scan order is derived based on the intra prediction mode applied to the current block.

According to this document, sine predicted coefficients can be determined based on the intra prediction mode applied to the current block, by considering the characteristics of the image to which the intra prediction mode is applied, sine prediction can be performed on coefficients with great influence, through this, the amount of bits for signing residual information can be reduced and coding accuracy can be improved.

According to this document, sine predicted coefficients can be determined considering the intra prediction mode applied to the current block and discontinuity with surrounding samples, considering the characteristics of the image, sine prediction can be performed for coefficients with a large influence, through this, the amount of bits for signing residual information can be reduced and coding accuracy can be improved.

According to this document, coding efficiency for residual information can be improved by adjusting the context coded bin related to the syntax element context-coded in the current block on which sine prediction has been performed.

Figure 1:
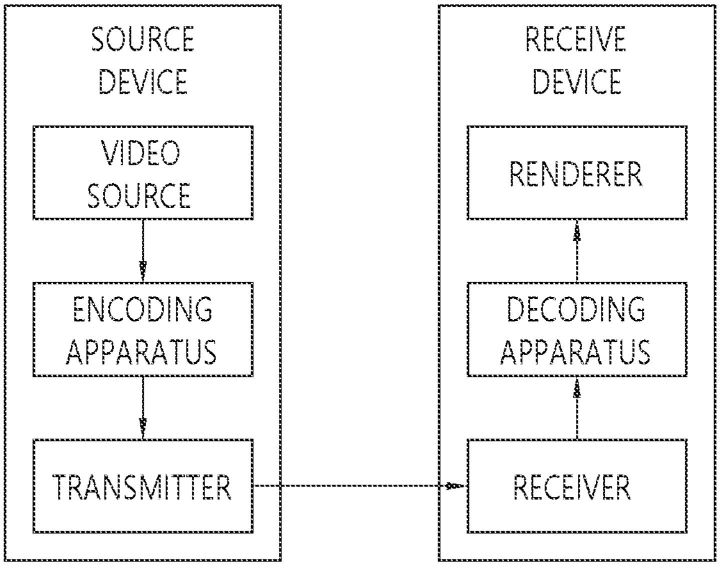
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals may be used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
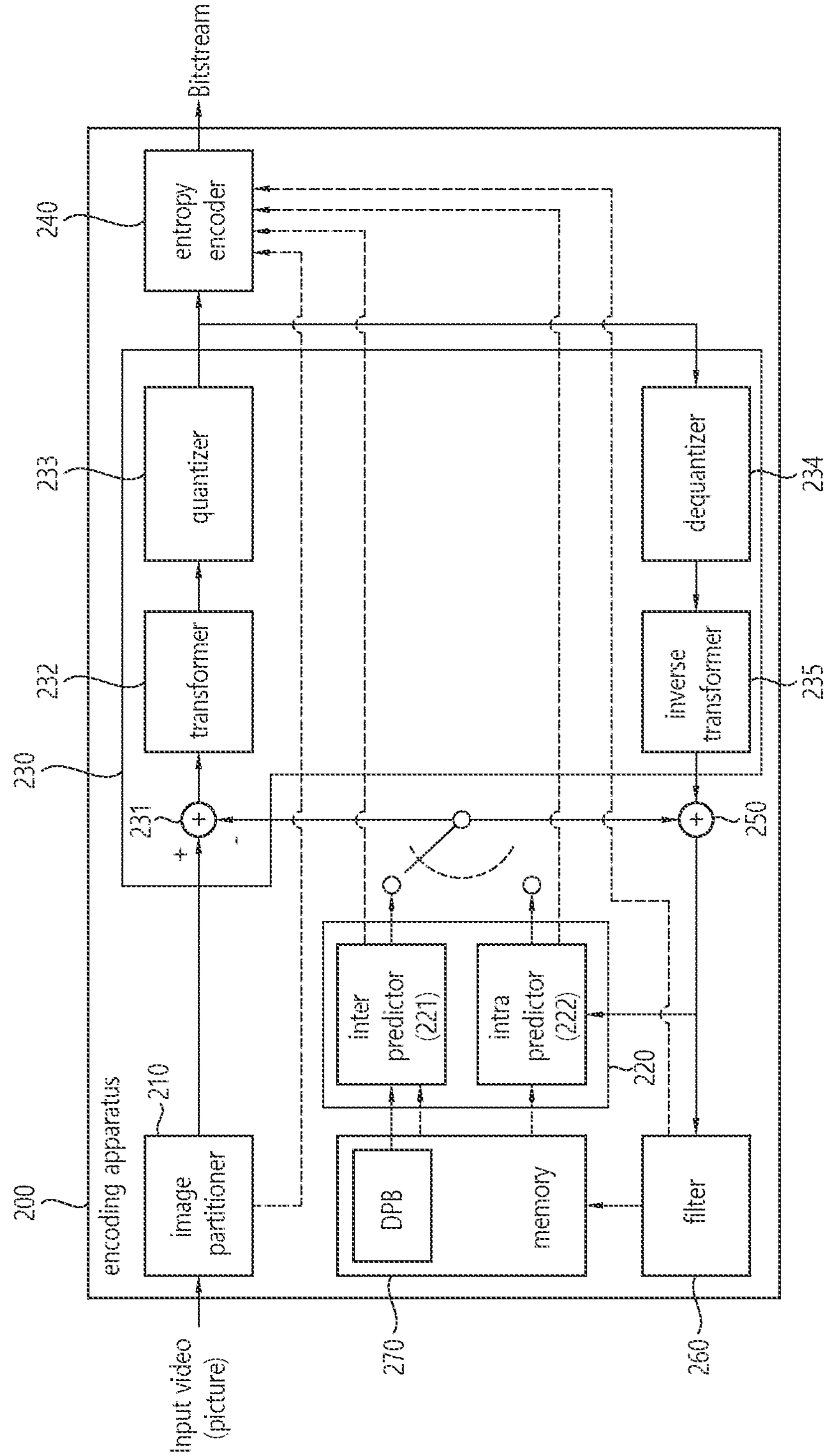
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
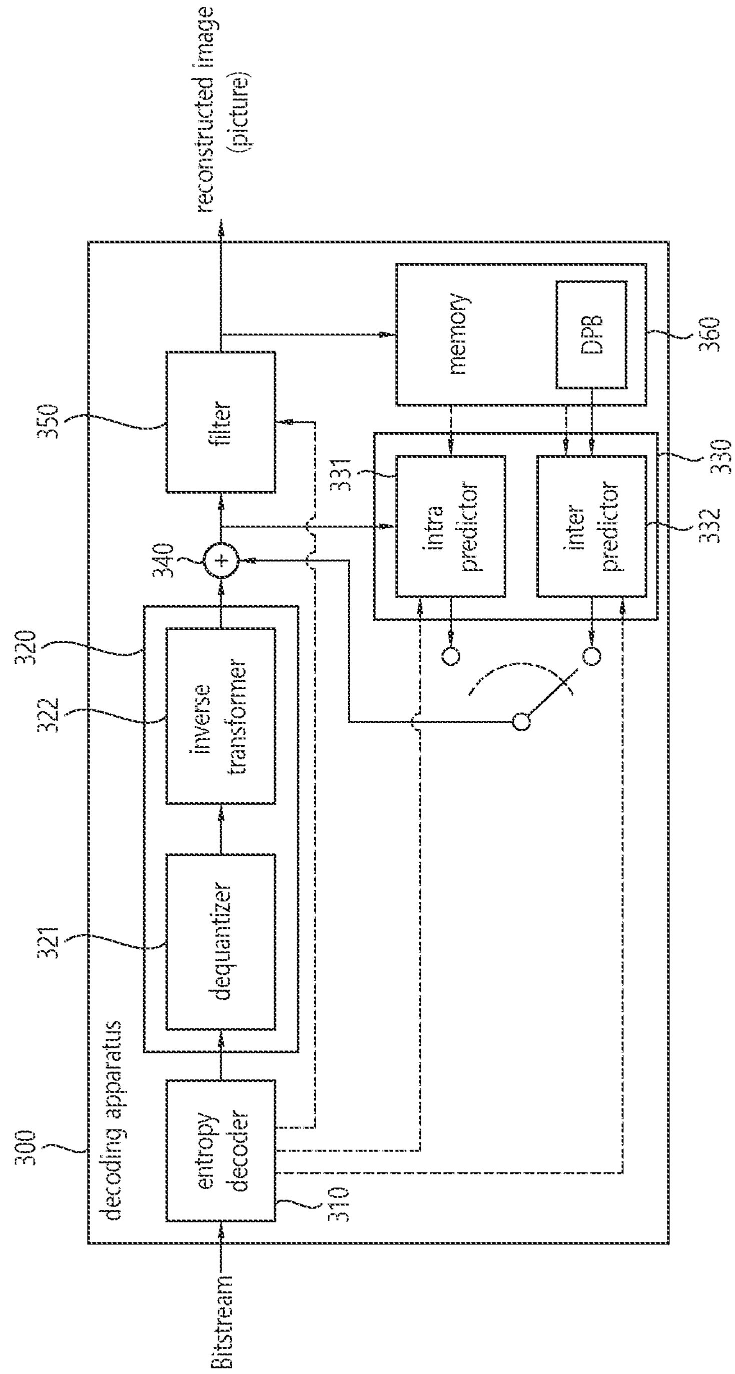
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Meanwhile, as described above, when performing video coding, prediction is performed to increase compression efficiency. Through this, a predicted block containing prediction samples for the current block, which is the coding target block, can be generated. For example, when the above-described intra prediction is performed, the correlation between samples can be used and the difference between the original block and the prediction block, that is, the residual, can be obtained. The above-described transformation and quantization can be applied to the residual, through which spatial redundancy can be removed. Specifically, the encoding method and decoding method in which intra prediction is used may be as described later.

Figure 4:
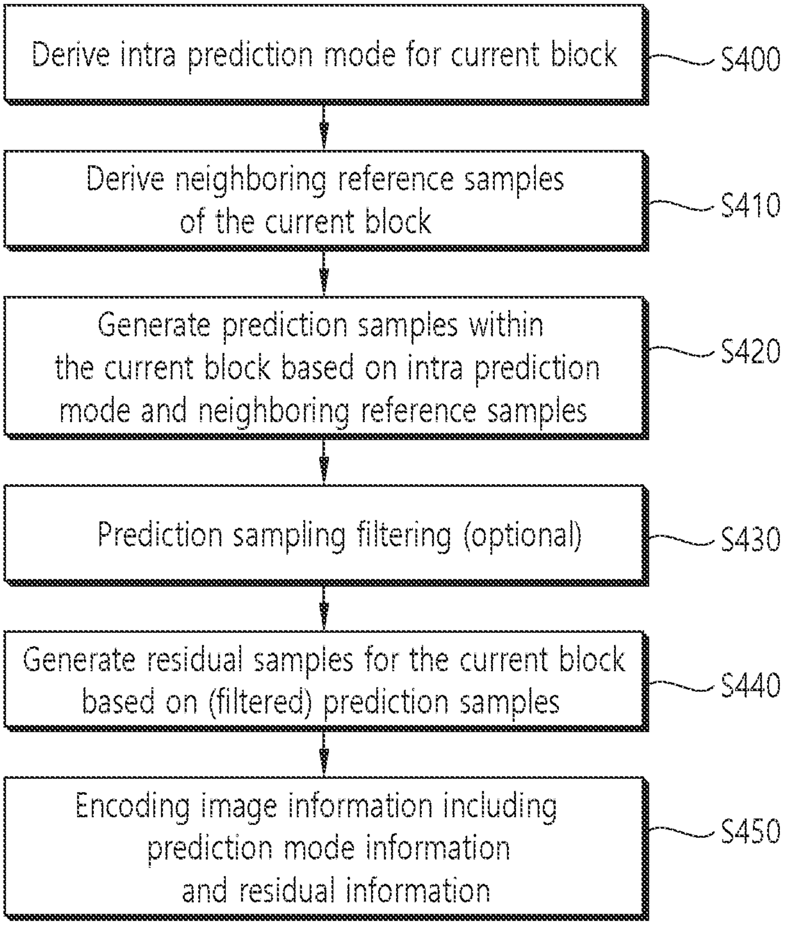
FIG. 4 shows an example of an intra prediction-based image encoding method.

FIG. 4 shows an example of an intra prediction-based image encoding method. Referring to FIG. 4, the encoding device may derive an intra prediction mode for the current block (S400) and derive surrounding reference samples of the current block (S410). The encoding device can determine the best intra prediction mode in which bit rate and distortion are optimized for the current block. The encoding device may generate prediction samples within the current block based on the intra prediction mode and the surrounding reference samples (S420). In this case, the encoding device may perform a prediction sample filtering procedure (S430). Predictive sample filtering can be called post filtering. Some or all of the prediction samples may be filtered by the prediction sample filtering procedure. In some cases, procedure S430 may be omitted.

The encoding device may generate residual samples for the current block based on the (filtered) prediction sample (S440). The encoding device may encode image information including prediction mode information indicating the intra prediction mode and residual information about the residual samples (S450). Encoded image information can be output in bitstream form. The output bitstream may be transmitted to a decoding device through a storage medium or network.

Figure 5:
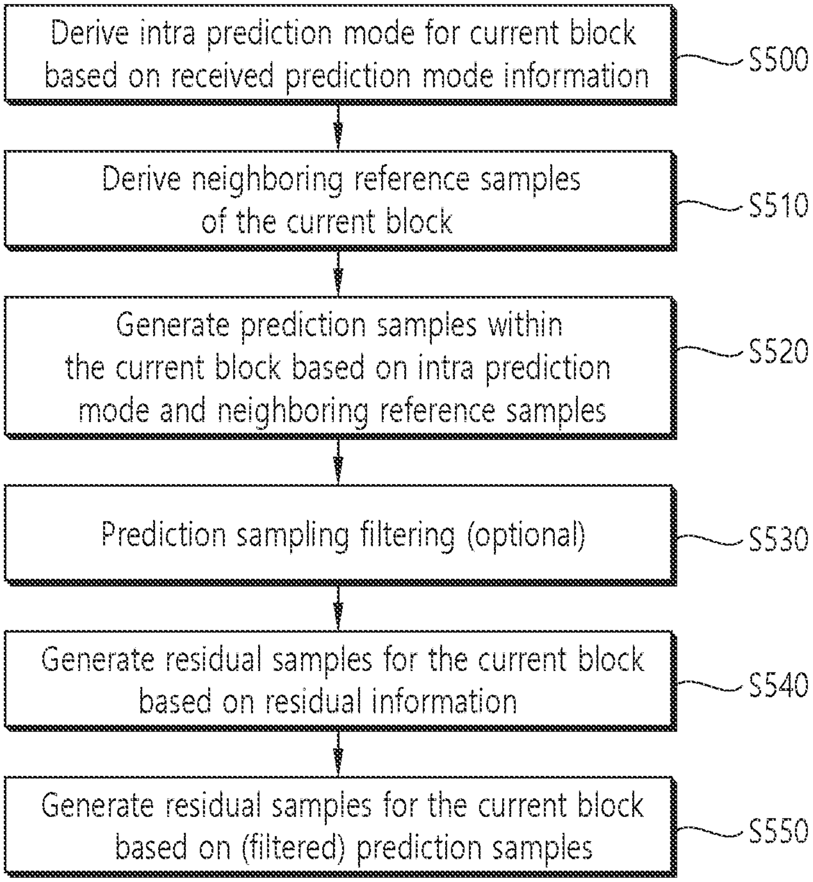
FIG. 5 shows an example of an intra prediction-based image decoding method.

FIG. 5 shows an example of an intra prediction-based image decoding method. Referring to FIG. 5, the decoding device can perform operations corresponding to the operations performed by the encoding device. For example, the decoding device may derive the intra prediction mode for the current block based on the received prediction mode information (S500). The decoding device may derive surrounding reference samples of the current block (S510). The decoding device may generate prediction samples within the current block based on the intra prediction mode and the surrounding reference samples (S520). In this case, the decoding device may perform a prediction sample filtering procedure (S530). Predictive sample filtering can be called post filtering. Some or all of the prediction samples may be filtered by the prediction sample filtering procedure. In some cases, the S530 procedure may be omitted.

The decoding device may generate residual samples for the current block based on the received residual information (S540). The decoding device may generate reconstructed samples for the current block based on the (filtered) prediction samples and the residual samples and generate a reconstructed picture based on these (S550).

Meanwhile, when intra prediction is applied to the current block, as described above, the encoding device/decoding device can derive an intra prediction mode for the current block, a prediction sample of the current block can be derived based on the intra prediction mode. That is, the encoding device/decoding device may derive the prediction sample of the current block by applying a directional mode or a non-directional mode based on the neighboring reference sample of the current block.

For reference, for example, the intra prediction mode may include two non-directional (or non-angular) intra prediction modes and 65 directional (or angular) intra prediction modes. The non-directional intra prediction modes may include a planar intra prediction mode of number 0 and a DC intra prediction mode of number 1, the directional intra prediction modes may include 65 intra prediction modes numbered 2 to 66. However, this is an example and this document can be applied even when the number of intra prediction modes is different. Meanwhile, in some cases, the 67th intra prediction mode may be further used, and the 67th intra prediction mode may represent a linear model (LM) mode.

Figure 6:
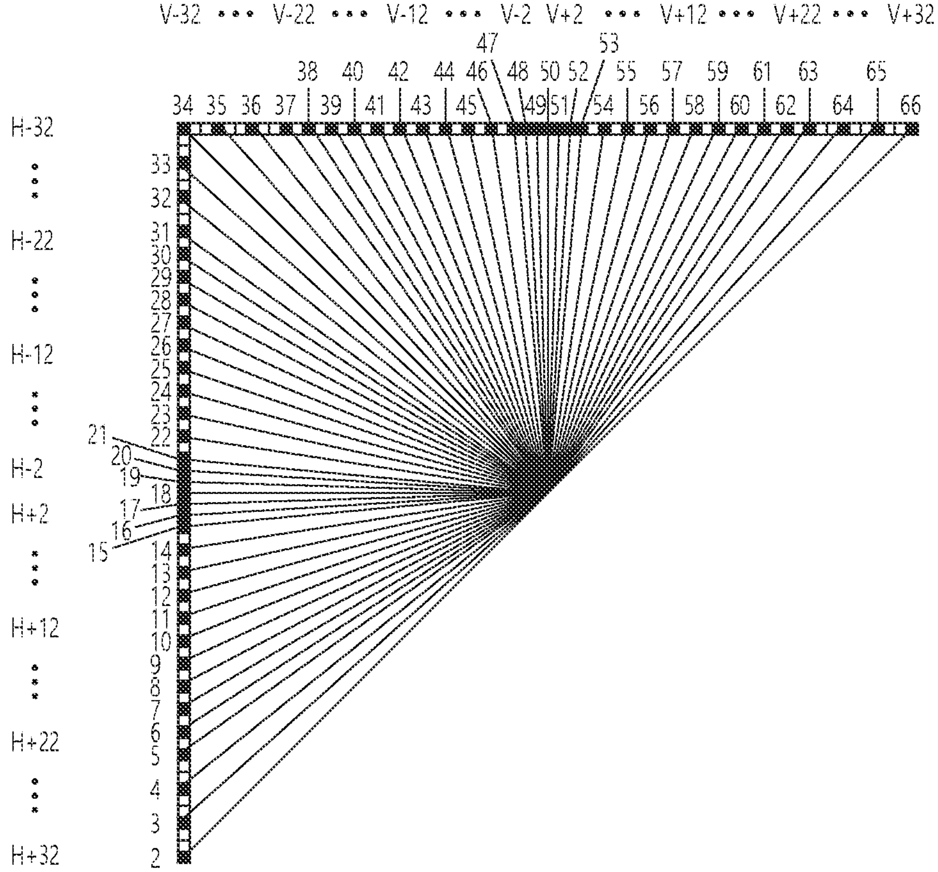
FIG. 6 exemplarily shows intra directional modes of 65 prediction directions.

FIG. 6 exemplarily shows intra directional modes of 65 prediction directions.

Referring to FIG. 6, an intra prediction mode with horizontal directionality and an intra prediction mode with vertical directionality can be distinguished centering on the 34th intra prediction mode with an upward-left diagonal prediction direction. H and V in FIG. 6 mean horizontal directionality and vertical directionality, respectively, the numbers −32 to 32 represent displacement in units of 1/32 on the sample grid position. The 2nd to 33th intra prediction modes have horizontal directionality, and the 34th to 66th intra prediction modes have vertical directionality. The 18th intra prediction mode and the 50th intra prediction mode represent the horizontal intra prediction mode and vertical intra prediction mode, respectively, the 2nd intra prediction mode may be called a downward-left diagonal intra prediction mode, the 34th intra prediction mode may be called an upward-left diagonal intra prediction mode, and the 66th intra prediction mode may be called an upward-right diagonal intra prediction mode.

Additionally, the encoding device and the decoding device can perform sign prediction on residual coefficients. For example, the encoding device and the decoding device can predict signs for a limited number of residual coefficients per block. Here, the block may be CU or TU, and the residual coefficient may be called a transform coefficient.

For example, if n signs are predicted in the current block, the encoding device and the decoding device can calculate costs for $2^n$ sign combination hypotheses, among the sign combination hypotheses, the sign combination hypothesis with the smallest cost can be predicted using the n signs. For example, if n signs are predicted in the current block, the encoding device and the decoding device may perform border reconstruction $2^n$ times corresponding to the $2^n$ sign combination hypotheses using a border-cost measure for each of the $2^n$ sign combination hypotheses. The costs can be examined to determine sine prediction values, the encoding device can use two additional CABAC contexts to transmit a syntax element for each predicted sign indicating whether the prediction for that sign was accurate. The syntax element may also be called a sign residual. The decoding device may parse syntax elements for the predicted signs, after performing sign prediction, the correct signs can be determined by determining whether the predicted signs are accurate based on the syntax elements. On the other hand, for example, only the signs for the luma coefficients can be predicted, sign prediction can be performed only on blocks where both the left neighboring block and the upper neighboring block exist.

Specifically, the sine prediction can be performed as follows.

The encoding device may initially dequantize the residual coefficients in the current block and select n residual coefficients for which the sine will be predicted. As an example, the encoding device may select n residual coefficients in raster scan order. For example, the residual coefficients can be scanned in raster scan order, when selecting a coefficient for which a sine is to be predicted, a residual coefficient having an inverse quantization value greater than or equal to a defined threshold may be selected with priority over a residual coefficient having a value lower than the threshold. Using the values of the selected n residual coefficients, $2^n$ simplified border reconstructions can be performed as described below. One restoration may be performed per specific combination of signs for the n residual coefficients. For example, for a particular reconstruction, only the leftmost pixels and topmost pixels of the block may be regenerated with the inverse transform added to the block prediction. The first inversion (vertical inversion) is complete, but the second inversion (horizontal inversion) can be faster because it only needs to generate the leftmost pixel and topmost pixel output. An additional flag called "topLeft" may be added to the inverse transform functions to allow this. Additionally, for example, the number of inversion operations performed can be reduced by using a system of 'templates'. A template can be defined as an inversely transformed block in the coordinates of a coefficient whose sine is to be predicted, assuming the coefficient to be 1 and inversely transformed. Operations using the template can be performed as follows.

1. The inverse transformation can be performed by setting one of the coefficients for which the sine will be predicted to 1 and setting the remaining coefficients to 0. That is, for the sine of n coefficients to be predicted, the kth (k is 0 to n−1) prediction coefficient can be set as 1, and the remaining coefficients can be set as 0, thereby setting it as a template. The block when all n templates are added can be defined as the first sign combination hypothesis.

2. A sine combination hypothesis in which only one sign represents a negative number can be constructed using the first sine combination hypothesis and each template. Additionally, other sign combination hypotheses can also be constructed using the already constructed sign combination hypothesis and template.

For example, when three signs are predicted, storage/restoration and template application may be as shown in the tables below. That is, the templates and sign combination hypotheses when three signs are predicted may be as shown in the tables below.

TABLE 1

| Template Name | How to Create |
|---|---|
| T001 | inv xform single +ve 1st sign-hidden coeff |
| T010 | inv xform single +ve 2nd sign-hidden coeff |
| T100 | inv xform single +ve 3rd sign-hidden coeff |

TABLE 2

| Hypothesis | How to Create | Store for later reuse as |
|---|---|---|
| H000 | inv xform all coeffs add to pred | H000 |
| H001 | H000 - 2*T001 | |
| H010 | H000 - 2*T010 | H010 |
| H011 | H010 - 2*T001 | |

TABLE 2-continued

| Hypothesis | How to Create | Store for later reuse as |
|---|---|---|
| H100 | H000 - 2*T100 | H100 |
| H101 | H100 - 2*T001 | |
| H110 | H100 - 2*T010 | H110 |
| H111 | H110 - 2*T001 | |

Alternatively, the sign combination hypothesis can be constructed using the Gray code method. That is, the kth sign combination hypothesis may be composed of the k−1th sign combination hypothesis and one of n templates (where k is 1 to n−1). The first sine combination hypothesis (where all sines are positive) can be constructed as the sum of all templates as described previously. For example, when four signs are predicted, storage/restoration and template application may be as shown in the tables below. That is, the templates and sign combination hypotheses when four signs are predicted may be as shown in the tables below.

TABLE 3

| idx | signCurr | TXXXX = templateBuf[0:numPredSigns−1] |
|---|---|---|
| 0 | 0000 | 0000 |
| 1 | 0001 | Previous hypothesis − 2 * T0001 |
| 2 | 0011 | Previous hypothesis − 2 * T0010 |
| 3 | 0010 | Previous hypothesis + 2 * T0001 |
| 4 | 0110 | Previous hypothesis − 2 * T0100 |
| 5 | 0111 | Previous hypothesis − 2 * T0001 |
| 6 | 0101 | Previous hypothesis + 2 * T0010 |
| 7 | 0100 | Previous hypothesis + 2 * T0001 |
| 8 | 1100 | Previous hypothesis − 2 * T1000 |
| 9 | 1101 | Previous hypothesis − 2 * T0001 |
| 10 | 1111 | Previous hypothesis − 2 * T0010 |
| 11 | 1110 | Previous hypothesis + 2 * T0001 |
| 12 | 1010 | Previous hypothesis + 2 * T0100 |
| 13 | 1011 | Previous hypothesis − 2 * T0001 |
| 14 | 1001 | Previous hypothesis + 2 * T0010 |
| 15 | 1000 | Previous hypothesis + 2 * T0001 |

The approximations disclosed in the above-mentioned tables can be used only in the sign prediction process, not in the final reconstruction process. That is, the approximate values may be restored values generated for a sine prediction process rather than a restored sample generation process of the current block.

The cost of the sine combination hypothesis can be calculated as follows.

There may be a cost associated with each signature combination hypothesis, corresponding to the notion of image continuity across block boundaries. That is, the cost of the sign combination hypothesis may correspond to the concept of image continuity at the block boundary for the sign combination hypothesis. By minimizing the cost, a sine prediction value can be derived.

Figure 7:
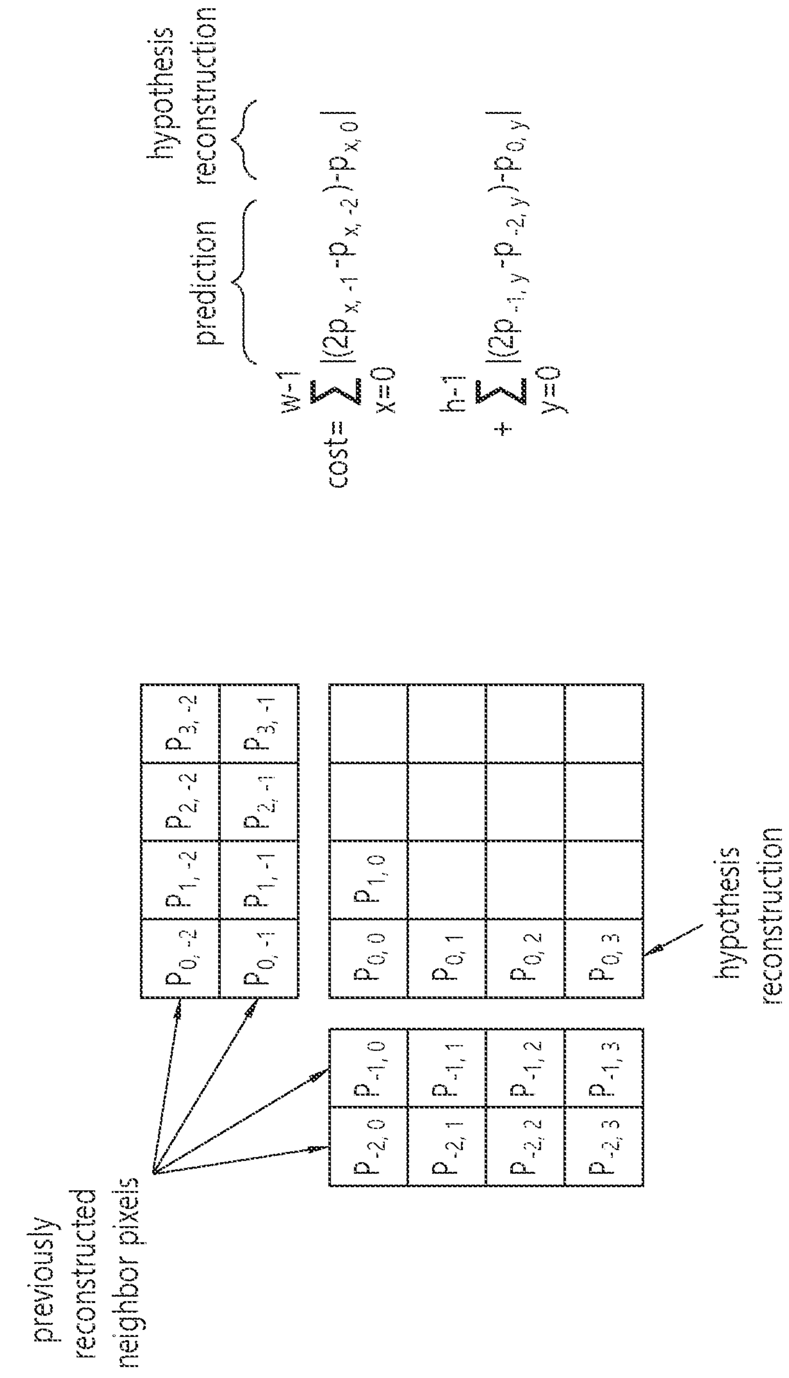
FIG. 7 exemplarily shows neighboring samples for deriving the cost of the sign combination hypothesis.

FIG. 7 exemplarily shows neighboring samples for deriving the cost of the sign combination hypothesis.

FIG. 7 discloses previously restored neighboring pixels and the leftmost pixels and topmost pixels of the current block for cost calculation. The neighboring pixels may include left neighboring pixels p–2,y and p–1,y, and upper neighboring pixels px,–2 and px,–2. Here, when the width and height of the current block are W and H, y may be 0 to H−1 and x may be 0 to W−1.

Referring to FIG. 7, for each p–1,y of the left sign combination hypothesis of the restored current block, a simple linear prediction using the two neighboring pixels of the corresponding pixel in the left sine combination hypothesis can be performed to obtain the predicted value pred0, y=(2p−1,y−p−2,y). The absolute difference between the predicted and reconstructed pixel p0,y can be added to the sine combination hypothesis cost. Additionally, for each px,–1 of the upper sign combination hypothesis of the restored current block, a simple linear prediction using the two neighboring pixels of the corresponding pixel of the upper sine combination hypothesis can be performed to obtain the predicted value predx,0=(2px,−1−px,−2), the absolute difference between the predicted and reconstructed pixel px,0 can be added to the sine combination hypothesis cost. That is, for example, the cost can be derived as follows.

$$\text{cost} = \sum_{x=0}^{w-1} |(2p_{x,-1} - p_{x,-2}) - p_{x,0}| + \sum_{y=0}^{h-1} |(2p_{-1,y} - p_{-1,y}) - p_{0,y}| \quad \text{[Equation 1]}$$

Here, w may represent the width of the current block, h may represent the height of the current block, px,–1 may represent the upper neighboring pixel at the (x,–1) location, px,–2 can represent the upper neighboring pixel at the (x,–2) location, p–1,y can represent the left neighboring pixel at the (–1,y) location, p–2,y can represent the left neighboring pixel at the (–2,y) location, px,0 may represent the hypothetical reconstructed pixel at position (x,0) located at the top of the current block, p0,y may represent a hypothetical restored pixel at the (0,y) position located at the left end of the current block. A pixel may be called a sample.

For each sign to be predicted, the encoding device may search for the lowest-cost sign combination hypothesis that matches the true values of the signs already transmitted. On the other hand, for example, initially the sine residual may not be transmitted and the sine combination hypothesis with the lowest cost may simply be searched. The predicted value of the current cause of death can be obtained from the searched cause combination hypothesis. That is, for example, the values of the n signs can be predicted by the sign combination hypothesis with the lowest cost among the sign combination hypotheses.

The sine residual may be sent as “0” if the prediction corresponds to the true value of the sign, otherwise it may be sent as “1”. That is, if the value of the predicted sign is correct, a syntax element for the sign with a value of 0 can be transmitted, if the value of the predicted sign is incorrect, a syntax element for the sign with a value of 1 may be transmitted. The syntax element may also be called a sine residual.

Additionally, for example, one of two CABAC contexts may be used to signal a specific sine prediction residual. That is, a specific sine prediction residual can be coded based on one of the CABAC contexts. Here, the CABAC contexts may be called context models. For example, the CABAC context to use may be determined based on whether the associated dequantization residual coefficient is below or above a threshold. For example, sine prediction residuals for a residual coefficient of a value higher than the threshold may be transmitted with a CABAC context initialized to expect a higher probability of correct prediction (i.e. higher probability of expecting zero residual). Current context initializations may be around 58% (below threshold) and 74% (above threshold).

Sine prediction of residual coefficients can only be applied partially in the area of TU. For example, the residual coefficient of the upper left CG (coefficient group) may be sine predicted. Or, for example, it can be applied only in the area promised between the encoder and decoder, and the size of the area may be a 32×32 area on the upper left of the TU. Signs of death Unpredicted signs of death may be signaled per CG. Signs Predicted signs may be signaled after other residual information of the current TU is signaled.

The decoding device may parse coefficients, sine and sine residuals as part of the parsing process. The sine residuals can be parsed at the end of the TU, and then the decoding device can know the absolute values of all coefficients. Therefore, the decoding device can determine which sign is expected, based on the dequantized coefficient values for each predicted sign, the context model to be used to parse the sign prediction residual can be determined.

Additionally, knowledge of whether a prediction is "correct" or "incorrect" can simply be stored as part of the CU data of the block being parsed. The actual sine of the residual coefficient may not be known at this point.

In the reconstruct process, the decoding device may perform operations similar to the encoding device. That is, the decoding device can perform the above-described sign combination hypothesis generation and cost calculation operations for sign prediction.

For example, for n signs predicted in a TU, the decoding device can determine the costs of the sign combination hypotheses by performing boundary reconstruction 2n times. Afterwards, the actual sine to be applied to the residual coefficient with the predicted sine can be determined by an exclusive-or operation of the values below.

1. The predicted value of the sign.

2. "Correct" or "incorrect" data stored in the CU by bitstream parsing.

Meanwhile, in each TU where the signs of the coefficients are "hidden" using the existing sign data hiding mechanism, sine prediction can be performed by treating the corresponding coefficients (i.e., coefficients where the sine is hidden) as "not available" in the sine prediction process and using only other coefficients.

When sign prediction is applied as described above, unlike the existing sign flag, syntax elements related to the sign are context-coded to reduce the amount of bits of information for representing the sign of the block and improve coding efficiency. In other words, in the existing image coding system, when coding a sine, bypass coding was performed because the probability of occurrence is 50:50 and there is no trend between the sine flags, but when sine prediction is performed, the more accurate the sine prediction is, the more likely it is that the syntax element will have a trend as to whether it is identical to the prediction or not, accordingly, context coding can be performed and coding efficiency can be achieved. However, the coding complexity may slightly increase due to the computational process for predicting the sign. Accordingly, this specification proposes embodiments that improve sign prediction.

Existing sine prediction can be applied to the CG (coefficient group) located last in the scan order within the TU. That is, sine prediction can be performed on the upper left CG within the TU including the DC component. Additionally, in existing sine prediction, M dequantized coefficients can be the target of sine prediction in raster scan order. Here, M can be defined as the number of coefficients that can occur in the current CG from 1, or the value of M can be arbitrarily set to 8. That is, in existing sine prediction, as described above, the sine values for the first 8 coefficients can be designated as the target of sine prediction in raster scan order. Alternatively, in existing sine prediction, as described above, sine values for coefficients greater than or equal to M specific thresholds in raster scan order may be designated as the target of sine prediction. Once the target coefficients for sine prediction are determined, up to 2M sine combinations can be generated, and the operation of specifying a template and calculating the cost using the repeated template can be performed as described above. The sine combination may also be called the sine combination hypothesis. Additionally, the cost may indicate the degree of discontinuity with reconstructed neighboring samples.

Therefore, to increase the accuracy of sine prediction, it may be advantageous to predict the sine of the coefficient component that greatly affects the discontinuity with neighboring samples after reconstruction. However, existing sine prediction can be applied to M dequantized coefficients simply in raster scan order. Therefore, in this embodiment, for more effective sign prediction, when the intra prediction mode is applied to the current block, the specification proposes a method of selecting a coefficient on which sine prediction is performed based on the intra prediction mode of the current block.

For example, according to this embodiment, when the horizontal intra prediction mode is applied to the current block, coefficients to which sine prediction is applied may be selected in vertical scan order rather than raster scan order. Or, for example, if a horizontal intra prediction mode or an intra prediction mode similar to the horizontal intra prediction mode is applied to the current block, coefficients to which sine prediction is applied may be selected in vertical scan order rather than raster scan order. The horizontal intra prediction mode may represent intra prediction mode number 18. Additionally, an intra prediction mode similar to the horizontal intra prediction mode may include a horizontal intra prediction mode and intra prediction modes within a specific offset (HOR_IDX±offset). That is, the intra prediction mode similar to the horizontal intra prediction mode may be the HOR_IDX−offset intra prediction mode or the HOR_IDX+offset intra prediction mode.

Additionally, for example, according to this embodiment, when the vertical intra prediction mode is applied to the current block, coefficients to which sine prediction is applied may be selected in horizontal scan order rather than raster scan order. Or, for example, if a vertical intra prediction mode or an intra prediction mode similar to the vertical intra prediction mode is applied to the current block, coefficients to which sine prediction is applied may be selected in horizontal scan order rather than raster scan order. The vertical intra prediction mode may represent intra prediction mode number 50. Additionally, an intra prediction mode similar to the vertical intra prediction mode may include a vertical intra prediction mode and intra prediction modes within a specific offset (VER_IDX±offset). That is, the intra prediction mode similar to the vertical intra prediction mode may be the VER_IDX−offset intra prediction mode or the VER_IDX+offset intra prediction mode.

The subsequent procedure can proceed in the same way as the existing method for predicting the cause of death.

Additionally, this specification proposes the following embodiment for sine prediction.

For example, an embodiment may be proposed in which coefficients are scanned in raster scan order, but M coefficients with the highest cost are selected by calculating L1 energy for the coefficients. For example, the encoding device/decoding device may select M residual coefficients with high costs among the residual coefficients in raster scan order as residual coefficients for sine prediction. The cost can be calculated as follows.

$$\text{cost} = |C_{i,j}| \cdot \sum_{k=0}^{N-1} |T_{i,j}(k)| \quad \text{[Equation 2]}$$

Here, C_(i,j) may be the coefficient value of the (i, j) position, T_(i,j) (k) may be a template corresponding to the position (i, j), N can be defined as the number of upper or left boundary pixels of the current block. Here, the current block may be CU or TU.

Through the above embodiment, sine prediction can be performed by selecting coefficients that have a significant influence on the boundary value of the TU for more effective sine prediction.

Additionally, this specification proposes the following embodiment for sine prediction.

For example, scan the coefficients with a scan order derived based on the intra prediction mode of the current block, an embodiment may be proposed in which M coefficients with the highest cost are selected by calculating the L1 energy for the coefficients. For example, if the intra-prediction mode of the current block is a vertical intra-prediction mode or an intra-prediction mode similar to the vertical intra-prediction mode, the horizontal scan order can be derived as the scan order of the current block, with the horizontal scan order, M residual coefficients with high costs among the residual coefficients can be selected as residual coefficients for sine prediction. Or, for example, if the intra prediction mode of the current block is a horizontal intra prediction mode or an intra prediction mode similar to the horizontal intra prediction mode, the vertical scan order can be derived as the scan order of the current block, with the vertical scan order, M residual coefficients with high costs among the residual coefficients can be selected as residual coefficients for sine prediction. The cost can be calculated as in Equation 2 described above.

Additionally, this specification proposes the following embodiment for sine prediction.

Context coding of syntax elements can achieve high coding efficiency, but may have limitations in throughput. Therefore, in image coding standards such as the existing HEVC or VVC standards, the number of context coded bins is limited to a certain threshold in entropy coding, when all allocated context coded bins are exhausted, bins for syntax elements to be coded thereafter are coded using bypass coding. Therefore, when sine prediction is applied, the syntax element for the sine is also context-coded, so this embodiment proposes a method of applying context-coded bin restrictions to sine prediction to preserve throughput.

For example, this embodiment proposes a method of including a syntax element for a context-coded sign when the sign prediction is applied to the limit on the number of context-coded bins for the current block. That is, for example, in order to limit the number of context-coded bins of the current block to a specific number, an embodiment of counting the number of context-coded bins including the syntax element for the sign may be proposed. For example, in the existing VVC standard, only 1.75 context coded bins were allowed per TU×the number of pixels within the TU. In this embodiment, the context coded bin limit within the TU is applied to the sine prediction, so that existing throughput can be preserved while maintaining coding efficiency at a certain level.

Additionally, in another embodiment, a method of separately controlling the number of context coded bins used for sign prediction may be proposed. For example, sine prediction may be performed only on the top-left CG within a TU, and therefore, the impact on throughput may not be significant. However, if many non-zero coefficients occur in the TU, there is no context coded bin that can be utilized in the upper left CG that performs sine prediction, so sine prediction may not be performed in the TU. Accordingly, this embodiment is proposed in which a certain number of context coded bins are allocated for sign prediction in order to ensure performance of sign prediction. For example, a certain number of context coded bins may be assigned as context bins for sign prediction of the current block. As an example, M context coded bins may be guaranteed for when sign prediction is performed for M signs, or the number of context coded bins derived in proportion to the size of the current block may be guaranteed, or the number of context coded bins derived based on slice QP may be guaranteed, or last coefficient position, that is, a variable number of context coded bins derived based on the last significant coefficient position may be guaranteed, or the number of context coded bins for separate sign prediction derived from a combination of the conditions presented above can be guaranteed. In other words, for example, a certain number of context coded bins may be assigned as context bins for sign prediction of the current block, the specific number may be derived based on the number of signs for which sign prediction is performed, or the specific number may be derived based on the size of the current block, or the specific number may be derived based on slice QP, or the specific number may be derived based on the last effective coefficient position of the current block, or the specific number can be derived based on a combination of the above-described conditions.

Figure 8:
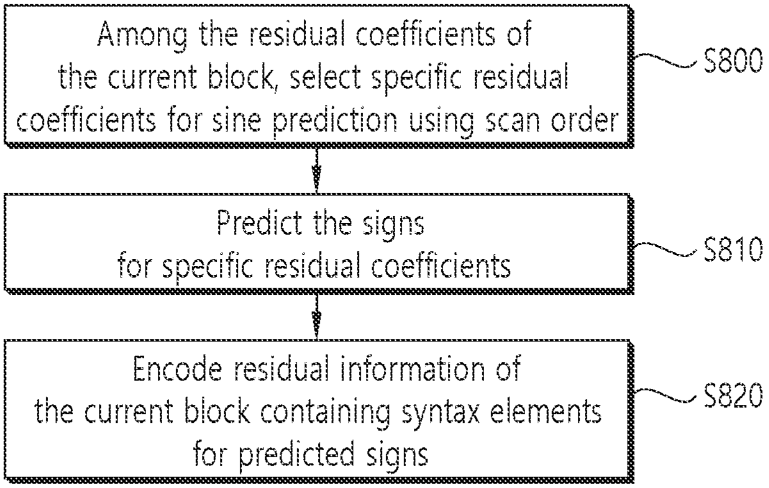
FIG. 8 schematically shows an image encoding method by the encoding device according to this document.

FIG. 8 schematically shows an image encoding method by the encoding device according to this document. The method disclosed in FIG. 8 may be performed by the encoding device disclosed in FIG. 2. Specifically, for example, S1400 to S1430 of FIG. 8 may be performed by the prediction unit of the encoding device, S1440 may be performed by the entropy encoding unit of the encoding device. In addition, although not shown, the process of deriving a residual sample for the current block based on the original sample and prediction sample for the current block may be performed by a subtraction unit of the encoding device, the process of generating residual information for the current block based on the residual sample may be performed by the residual processing unit of the encoding device, the process of encoding image information including the residual information may be performed by an entropy encoding unit of the encoding device.

The encoding device selects specific residual coefficients for sine prediction using scan order among the residual coefficients of the current block (S800). The encoding device may select specific residual coefficients for sine prediction using scan order among the residual coefficients of the current block.

For example, the encoding device may perform sine prediction on the current block. The encoding device can select specific residual coefficients for sine prediction using scan order.

For example, the specific residual coefficients may be M residual coefficients of the scan order. Or, for example, the costs of the residual coefficients of the current block may be calculated with the scan order, M residual coefficients in descending order of costs may be selected as the specific residual coefficient. For example, the cost of the residual coefficient of the current block can be derived based on Equation 2 described above. The encoding device scans the residual coefficients of the current block using the scan order, by calculating the costs of the residual coefficients, M residual coefficients in descending order of cost can be selected as specific residual coefficients for sine prediction. Meanwhile, for example, M may be a preset value. Alternatively, for example, a syntax element may be generated indicating the number of residual coefficients predicted to be sine of the current block. The syntax element indicating the number of sine predicted residual coefficients may be signaled as SPS (sequence parameter set), PPS (picture parameter set), picture header, slice header, CU syntax (coding unit syntax), or TU syntax (transform unit syntax). Image information may include the above syntax element.

Additionally, as an example, the scan order may be a raster scan order. For example, the specific residual coefficients may be M residual coefficients of the raster scan order. Or, for example, the costs of the residual coefficients of the current block may be calculated in the raster scan order, M residual coefficients in descending order of costs may be selected as the specific residual coefficient. For example, the cost of the residual coefficient of the current block can be derived based on Equation 2 described above.

Or, as an example, the scan order may be derived based on the intra prediction mode applied to the current block. For example, the encoding device can determine whether to perform inter-prediction or intra-prediction on the current block, a specific inter prediction mode or a specific intra prediction mode can be determined based on the RD cost. According to the determined mode, the encoding device can derive prediction samples for the current block.

For example, when the intra prediction mode of the current block is a horizontal intra prediction mode, the scan order may be derived as a vertical scan order. For example, the specific residual coefficients may be the M residual coefficients of the vertical scan order. Or, for example, the costs of the residual coefficients of the current block may be calculated with the vertical scan order, M residual coefficients in descending order of costs may be selected as the specific residual coefficient. For example, the cost of the residual coefficient of the current block can be derived based on Equation 2 described above.

Or, for example, when the intra prediction mode of the current block is a vertical intra prediction mode, the scan order may be derived as a horizontal scan order. For example, the specific residual coefficients may be the M residual coefficients of the horizontal scan order. Or, for example, the costs of the residual coefficients of the current block may be calculated with the horizontal scan order, M residual coefficients in descending order of costs may be selected as the specific residual coefficient. For example, the cost of the residual coefficient of the current block can be derived based on Equation 2 described above.

Or, for example, if the intra prediction mode of the current block is one of specific horizontal directional intra prediction modes, the scan order may be derived as a vertical scan order. The specific horizontal directional intra prediction modes may be the HOR_IDX−offset intra prediction mode to the HOR_IDX+offset intra prediction mode. Here, the HOR_IDX intra prediction mode may be a horizontal intra prediction mode. For example, the horizontal intra prediction mode may be intra prediction mode number 18. The offset may be a preset value. Alternatively, the offset may be a value derived based on a syntax element indicating the offset. The specific horizontal directional intra prediction modes may be intra prediction modes similar to the horizontal intra prediction mode described above. For example, when the scan order is derived from the vertical scan order, the specific residual coefficients may be M residual coefficients of the vertical scan order. Or, for example, if the scan order is derived from the vertical scan order, the costs of the residual coefficients of the current block can be calculated with the vertical scan order, M residual coefficients in descending order of costs may be selected as the specific residual coefficient. For example, the cost of the residual coefficient of the current block can be derived based on Equation 2 described above.

Or, for example, if the intra prediction mode of the current block is one of specific vertical directional intra prediction modes, the scan order may be derived as a horizontal scan order. The specific vertical directional intra prediction modes may be VER_IDX−offset intra prediction mode to VER_IDX+offset intra prediction mode. Here, the VER_IDX intra prediction mode may be a vertical intra prediction mode. For example, the vertical intra prediction mode may be intra prediction mode number 50. The offset may be a preset value. Alternatively, the offset may be a value derived based on a syntax element indicating the offset. The specific vertical directional intra prediction modes may be intra prediction modes similar to the vertical intra prediction mode described above. For example, when the scan order is derived from the horizontal scan order, the specific residual coefficients may be M residual coefficients of the horizontal scan order. Or, for example, if the scan order is derived from the horizontal scan order, the costs of the residual coefficients of the current block can be calculated with the horizontal scan order, M residual coefficients in descending order of costs may be selected as the specific residual coefficient. For example, the cost of the residual coefficient of the current block can be derived based on Equation 2 described above.

Meanwhile, for example, the encoding device may derive residual samples of the current block through subtraction of original samples and prediction samples for the current block in the current picture, the residual coefficients of the current block can be derived based on the residual samples.

The encoding device predicts signs for the specific residual coefficients (S810). The encoding device can predict signs for the specific residual coefficients.

For example, the encoding device can predict signs for the specific residual coefficients by performing the sign prediction process described above. For example, the encoding device may calculate costs for sign combination hypotheses of the specific residual coefficients, among the sign combination hypotheses, the sign combination hypothesis with the smallest cost can be predicted using the signs of the specific residual coefficients. For example, the encoding device may perform partial inverse transformation and border reconstruction for the sine combination hypothesis to derive hypothesis reconstructed samples of the current block for the sine combination hypothesis, the cost for the sign combination hypothesis can be calculated based on the left neighboring samples and upper neighboring samples of the current block and the hypothesis reconstructed samples. The cost can be derived based on Equation 1 described above. Meanwhile, the sine combination hypothesis may also be called a sine combination candidate.

The encoding device encodes residual information of the current block including syntax elements for the predicted signs (S820). The encoding device may encode residual information of the current block including syntax elements for the predicted signs. For example, the syntax elements for the predicted signs may indicate whether the predicted signs are accurate. That is, for example, a target syntax element among the syntax elements may indicate whether the predicted sign for the target syntax element is accurate. A syntax element for the predicted sine of a specific residual coefficient of the current block may represent the sine residual described above. Additionally, for example, the context-coded bins of the current block, including context-coded bins of the syntax elements for the predicted signs, may be limited to a certain number. Or, for example, the context coded bins of the syntax elements for the predicted signs may be adjusted separately. For example, context coded bins of residual information of the current block excluding the syntax elements may be limited to a first specific number, the context coded bins of the syntax elements may be limited to a second specific number. Image information may include the residual information.

Meanwhile, for example, an encoding device may generate and encode prediction mode information for the current block. For example, the prediction mode information may indicate an intra prediction mode applied to the current block.

Additionally, for example, an encoding device may encode residual information about the residual samples. The residual information may include syntax elements for predicted signs of specific residual coefficients of the current block. Additionally, the residual information may include a syntax element indicating the number of residual coefficients for which the sign of the current block is predicted.

The image information may include prediction mode information and/or residual information of the current block. Additionally, for example, the encoding device may encode image information and output it in the form of a bitstream.

Meanwhile, a bitstream containing the image information may be transmitted to a decoding device through a network or (digital) storage medium. Here, the network may include a broadcasting network and/or a communication network, and the digital storage medium may include various storage media such as USB, SD, CD, DVD, Blu-ray, HDD, and SSD.

Figure 9:
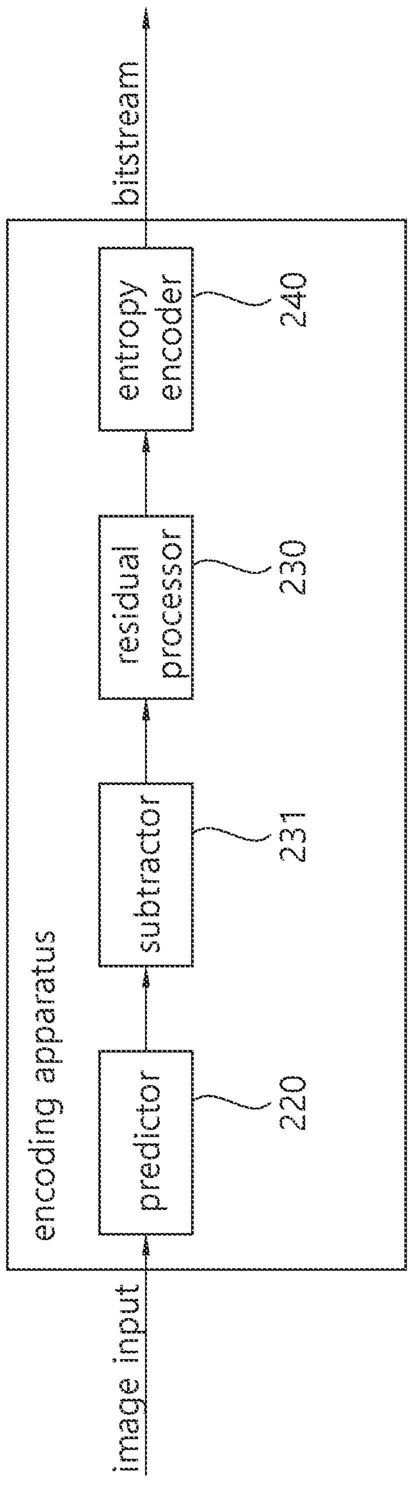
FIG. 9 schematically shows an encoding device that performs the image encoding method according to this document.

FIG. 9 schematically shows an encoding device that performs the image encoding method according to this document. The method disclosed in FIG. 8 may be performed by the encoding device disclosed in FIG. 9. Specifically, for example, the residual processing unit of the encoding device of FIG. 9 may perform S800 to S810, the entropy encoding unit of the encoding device may perform S820. Additionally, although not shown, the process of generating reconstructed samples and a reconstructed picture based on the residual samples and prediction samples may be performed by an addition unit of the encoding device.

Figure 10:
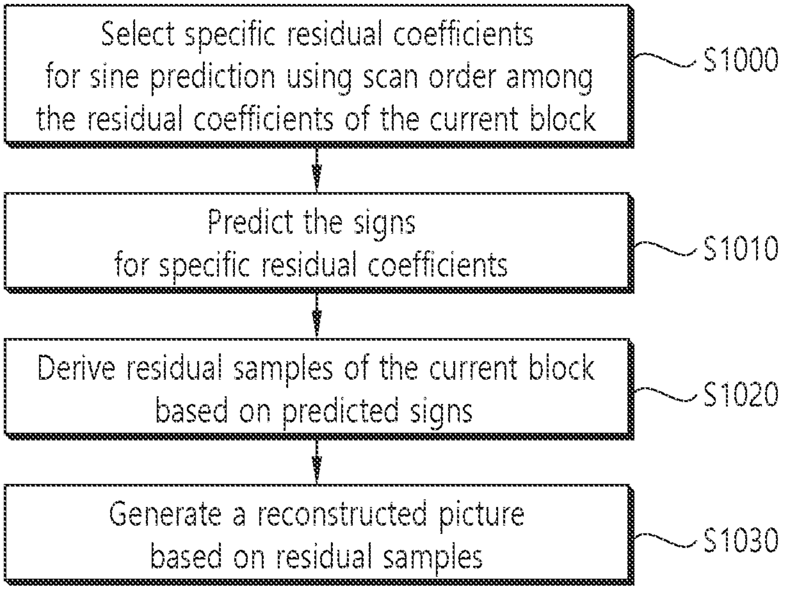
FIG. 10 schematically shows an image decoding method by the decoding device according to this document.

FIG. 10 schematically shows an image decoding method by the decoding device according to this document. The method disclosed in FIG. 10 can be performed by the decoding device disclosed in FIG. 3. Specifically, for example, S1000 to S2430 of FIG. 10 may be performed by the prediction unit of the decoding device. In addition, although not shown, the process of obtaining image information including information about intra prediction mode information and residual for the current block through a bitstream may be performed by an entropy decoding unit of the decoding device, the process of deriving the residual sample for the current block based on the residual information may be performed by an inverse transform unit of the decoding device, the process of generating a reconstructed picture based on the prediction sample and the residual sample may be performed by an addition unit of the decoding device.

The decoding device selects specific residual coefficients for sine prediction using scan order among the residual coefficients of the current block (S1000). The decoding device may select specific residual coefficients for sine prediction using scan order among the residual coefficients of the current block.

For example, the decoding device may perform sine prediction for the current block. The decoding device can select specific residual coefficients for the sine prediction using scan order.

For example, the specific residual coefficients may be M residual coefficients of the scan order. Or, for example, the costs of the residual coefficients of the current block may be calculated in the scan order, and M residual coefficients in descending order of the costs may be selected as the specific residual coefficient. For example, the cost of the residual coefficient of the current block can be derived based on Equation 2 described above. The decoding device scans the residual coefficients of the current block using the scan order, by calculating the costs of the residual coefficients, M residual coefficients in descending order of cost can be selected as specific residual coefficients for sine prediction. Meanwhile, for example, M may be a preset value. Or, for example, a syntax element indicating the number of residual coefficients predicted to be sine of the current block may be obtained, and the M may be derived based on the syntax element. The syntax element indicating the number of sine predicted residual coefficients may be signaled as Sequence parameter set (SPS), picture parameter set (PPS), picture header, slice header, coding unit syntax (CU syntax), or transform unit syntax (TU syntax). Image information may include the above syntax element.

Additionally, as an example, the scan order may be a raster scan order. For example, the specific residual coefficients may be M residual coefficients of the raster scan order. Or, for example, the costs of the residual coefficients of the current block may be calculated in the raster scan order, M residual coefficients in descending order of costs may be selected as the specific residual coefficient. For example, the cost of the residual coefficient of the current block can be derived based on Equation 2 described above.

Or, as an example, the scan order may be derived based on the intra prediction mode applied to the current block. Prediction mode information for the current block may be obtained, and the intra prediction mode for the current block may be derived based on the prediction mode information. Image information may include the prediction mode information.

For example, when the intra prediction mode of the current block is a horizontal intra prediction mode, the scan order may be derived as a vertical scan order. For example, the specific residual coefficients may be the M residual coefficients of the vertical scan order. Or, for example, the costs of the residual coefficients of the current block may be calculated with the vertical scan order, M residual coefficients in descending order of costs may be selected as the specific residual coefficient. For example, the cost of the residual coefficient of the current block can be derived based on Equation 2 described above.

Or, for example, when the intra prediction mode of the current block is a vertical intra prediction mode, the scan order may be derived as a horizontal scan order. For example, the specific residual coefficients may be the M residual coefficients of the horizontal scan order. Or, for example, the costs of the residual coefficients of the current block may be calculated with the horizontal scan order, M residual coefficients in descending order of costs may be selected as the specific residual coefficient. For example, the cost of the residual coefficient of the current block can be derived based on Equation 2 described above.

Or, for example, if the intra prediction mode of the current block is one of specific horizontal directional intra prediction modes, the scan order may be derived as a vertical scan order. The specific horizontal directional intra prediction modes may be the HOR_IDX−offset intra prediction mode to the HOR_IDX+offset intra prediction mode. Here, the HOR_IDX intra prediction mode may be a horizontal intra prediction mode. For example, the horizontal intra prediction mode may be intra prediction mode number 18. The offset may be a preset value. Alternatively, the offset may be a value derived based on a syntax element indicating the offset. The specific horizontal directional intra prediction modes may be intra prediction modes similar to the horizontal intra prediction mode described above. For example, when the scan order is derived from the vertical scan order, the specific residual coefficients may be M residual coefficients of the vertical scan order. Or, for example, when the scan order is derived from the vertical scan order, the costs of the residual coefficients of the current block may be calculated with the vertical scan order, M residual coefficients in descending order of costs may be selected as the specific residual coefficient. For example, the cost of the residual coefficient of the current block can be derived based on Equation 2 described above.

Or, for example, if the intra prediction mode of the current block is one of specific vertical directional intra prediction modes, the scan order may be derived as a horizontal scan order. The specific vertical directional intra prediction modes may be VER_IDX−offset intra prediction mode to VER_IDX+offset intra prediction mode. Here, the VER_IDX intra prediction mode may be a vertical intra prediction mode. For example, the vertical intra prediction mode may be intra prediction mode number 50. The offset may be a preset value. Alternatively, the offset may be a value derived based on a syntax element indicating the offset. The specific vertical directional intra prediction modes may be intra prediction modes similar to the vertical intra prediction mode described above. For example, when the scan order is derived from the horizontal scan order, the specific residual coefficients may be M residual coefficients of the horizontal scan order. Or, for example, when the scan order is derived from the horizontal scan order, the costs of the residual coefficients of the current block may be calculated with the horizontal scan order, M residual coefficients in descending order of costs may be selected as the specific residual coefficient. For example, the cost of the residual coefficient of the current block can be derived based on Equation 2 described above.

The decoding device predicts signs for the specific residual coefficients (S1010). The decoding device can predict signs for the specific residual coefficients.

For example, the decoding device can predict signs for the specific residual coefficients by performing the sign prediction process described above. For example, the decoding device can calculate costs for sign combination hypotheses of the specific residual coefficients, among the sign combination hypotheses, the sign combination hypothesis with the smallest cost can be predicted using the signs of the specific residual coefficients. For example, the decoding device may perform partial inverse transformation and border reconstruction for the sine combination hypothesis to derive hypothesis reconstructed samples of the current block for the sine combination hypothesis, the cost for the sign combination hypothesis can be calculated based on the left neighboring samples and upper neighboring samples of the current block and the hypothesis reconstructed samples. The cost can be derived based on Equation 1 described above. Meanwhile, the sine combination hypothesis may also be called a sine combination candidate.

The decoding device derives residual samples of the current block based on the predicted signs (S1020). The decoding device may derive residual samples of the current block based on the predicted signs.

For example, the decoding device may determine whether the predicted signs are accurate based on syntax elements for the predicted signs, and may derive signs of the specific residual coefficient based on the result of the determination. For example, a decoding device may obtain residual information of the current block, and the residual information may include syntax elements for the predicted signs. For example, the syntax elements for the predicted signs may indicate whether the predicted signs are accurate. That is, for example, a target syntax element among the syntax elements may indicate whether the predicted sign for the target syntax element is accurate. For example, if the target syntax element indicates that the predicted sign for the target syntax element is correct, the decoding device may determine that the predicted sign is accurate, the predicted sign can be derived as a sign of a specific residual coefficient for the predicted sign. Or, for example, if the target syntax element indicates that the predicted sign for the target syntax element is incorrect, the decoding device may determine that the predicted sign is incorrect, a sign opposite to the predicted sign can be derived as a sign of a specific residual coefficient for the predicted sign. That is, for example, if the target syntax element indicates that the predicted sign for that target syntax element is incorrect, if the predicted sign is positive, the sign of a specific residual coefficient for the predicted sign can be derived as negative, if the predicted sine is negative, the sine of a specific residual coefficient for the predicted sine can be derived as a positive number. A syntax element for the predicted sine of a specific residual coefficient of the current block may represent the sine residual described above. Additionally, for example, the context-coded bins of the current block, including context-coded bins of the syntax elements for the predicted signs, may be limited to a certain number. Or, for example, the context coded bins of the syntax elements for the predicted signs may be adjusted separately. For example, context coded bins of residual information of the current block excluding the syntax elements may be limited to a first specific number, the context coded bins of the syntax elements may be limited to a second specific number.

Thereafter, for example, the decoding device may derive absolute values of the specific residual coefficients based on the residual information of the current block, residual samples for the specific residual coefficients can be derived based on the derived signs and the absolute values for the specific residual coefficients.

The decoding device generates a reconstructed picture based on the residual samples (S1030). For example, a decoding device may generate a reconstructed picture based on the residual samples.

Meanwhile, for example, the decoding device may perform inter prediction mode or intra prediction mode for the current block based on prediction mode information obtained through a bitstream to derive prediction samples, the reconstructed picture can be generated through addition of the prediction samples and the residual samples. For example, the decoding device may derive an intra prediction mode for the current block based on prediction mode information, prediction samples of the current block can be derived based on the intra prediction mode, reconstructed samples and reconstructed pictures can be generated through addition of the prediction samples and the residual samples. As described above, in-loop filtering procedures such as deblocking filtering, SAO and/or ALF procedures can be applied to the reconstructed samples to improve subjective/objective image quality as needed.

Meanwhile, for example, a decoding device may obtain image information of the current block through a bitstream. The image information may include prediction mode information and/or residual information of the current block. The residual information may include syntax elements for predicted signs of specific residual coefficients of the current block. Additionally, the residual information may include a syntax element indicating the number of residual coefficients for which the sign of the current block is predicted.

Figure 11:
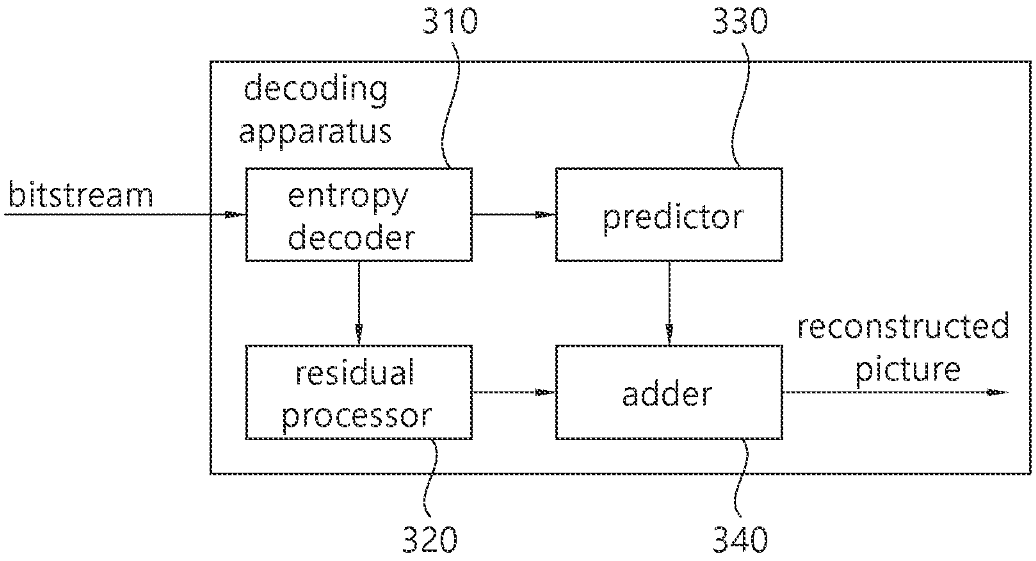
FIG. 11 schematically shows a decoding device that performs the image decoding method according to this document.

FIG. 11 schematically shows a decoding device that performs the image decoding method according to this document. The method disclosed in FIG. 10 can be performed by the decoding device disclosed in FIG. 11. Specifically, for example, the residual processing unit of the decoding device of FIG. 11 may perform steps S1000 to S1020 of FIG. 10, and the adder of the decoding device of FIG. 11 may perform step S1030 of FIG. 10.

According to this document described above, sine predicted coefficients can be determined based on the intra prediction mode applied to the current block, by considering the characteristics of the image to which the intra prediction mode is applied, sine prediction can be performed on coefficients with great influence, through this, the amount of bits for signing residual information can be reduced and coding accuracy can be improved.

In addition, according to this document, the sine predicted coefficients can be determined by considering the intra prediction mode applied to the current block and the discontinuity with neighboring samples, considering the characteristics of the image, sine prediction can be performed for coefficients with a large influence, through this, the amount of bits for signing residual information can be reduced and coding accuracy can be improved.

Additionally, according to this document, coding efficiency for residual information can be improved by adjusting the context coded bin related to the syntax element context-coded in the current block on which sine prediction has been performed.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 12:
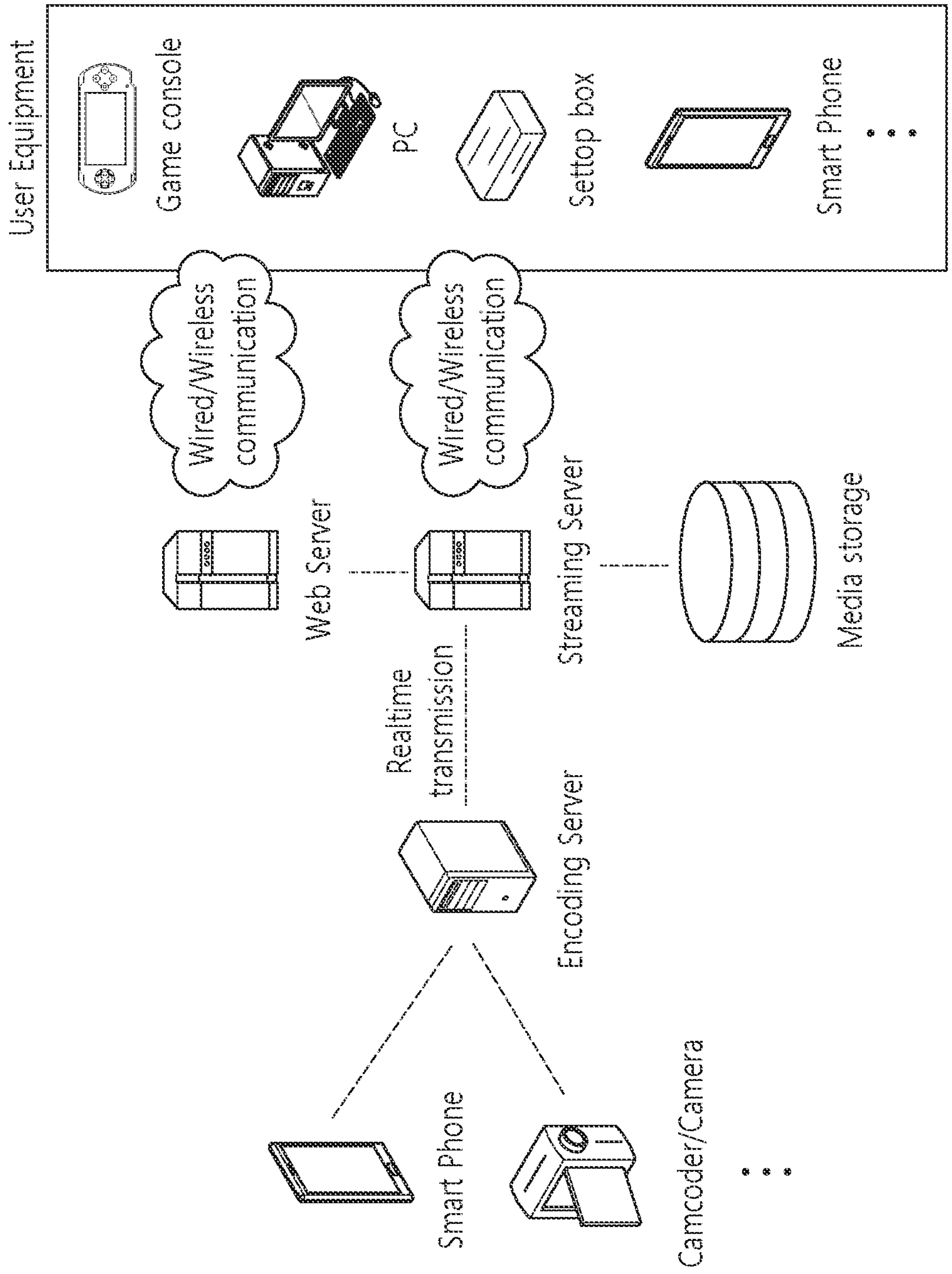
FIG. 12 exemplarily shows a content streaming system structural diagram to which embodiments of this document are applied.

FIG. 12 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. A method for an image decoding, the method performed by a decoding apparatus and comprising:

selecting specific residual coefficients for sign prediction using a scan order for the sign prediction among the residual coefficients of a current block;

predicting signs for the specific residual coefficients;

deriving residual samples of the current block based on the predicted signs; and generating a reconstructed picture based on the residual samples, wherein the scan order for the sign prediction is derived based on an intra prediction mode applied to the current block, wherein the selecting of the specific residual coefficients comprises calculating costs of the residual coefficients of the current block along the scan order, and selecting the specific residual coefficients for the sign prediction based on the costs of the residual coefficients, and wherein the costs of the residual coefficients are derived based on values of the residual coefficient and values of a template, corresponding to positions of the residual coefficients, for border samples of the current block.

2. The method of claim 1, wherein the specific residual coefficients are M residual coefficients of the scan order.

3. The method of claim 1, wherein the scan order is derived as a vertical scan order based on the intra prediction mode of the current block being a horizontal intra prediction mode, and wherein the scan order is derived as a horizontal scan order based on the intra prediction mode of the current block being a vertical intra prediction mode.

4. The method of claim 1, wherein the scan order is derived as a vertical scan order based on the intra prediction mode of the current block being one of specific horizontal directional intra prediction modes, the specific horizontal directional intra prediction modes are a HOR_IDX−offset intra prediction mode to a HOR_IDX+offset intra prediction mode, and a HOR_IDX intra prediction mode is a horizontal intra prediction mode, and wherein the scan order is derived as a horizontal scan order based on the intra prediction mode of the current block being one of specific vertical directional intra prediction modes, the specific vertical directional intra prediction modes are a VER_IDX−offset intra prediction mode to a VER_IDX+offset intra prediction mode, and a VER_IDX intra prediction mode is a vertical intra prediction mode.

5. The method of claim 1, wherein the scan order is derived as a vertical scan order based on the intra prediction mode of the current block being a horizontal intra prediction mode, and wherein the scan order is derived as a horizontal scan order based on the intra prediction mode of the current block being a vertical intra prediction mode.

6. The method of claim 1, wherein each of the costs of the residual coefficients of the current block is derived based on the following equation, $$\text{cost} = |C_{i,j}| \cdot \sum_{k=0}^{N-1} |T_{i,j}(k)|$$

where, cost represents the cost of the residual coefficient, $C_{i,j}$ is a value of the residual coefficient at position (i, j), $T_{i,j}$ is a template corresponding to position (i, j), and N represents a number of border pixels of the current block.

7. The method of claim 1, wherein deriving the residual samples of the current block based on the predicted signs includes:

determining whether the predicted signs are accurate based on syntax elements for the predicted signs; and deriving signs of the specific residual coefficients based on a result of the determination, wherein a target syntax element among the syntax elements represents whether a predicted sign for the target syntax element is accurate.

8. The method of claim 7, wherein the number of context-coded bins for the current block, including the context-coded bins of the syntax elements for the predicted signs, is limited to a specific threshold.

9. The method of claim 7, wherein context coded bins of residual information of the current block excluding the syntax elements are limited to a first specific number, and wherein context coded bins of the syntax elements are limited to a second specific number.

10. A method for an image encoding, the method performed by an encoding apparatus and comprising:

selecting specific residual coefficients for sign prediction using a scan order for the sign prediction among residual coefficients of a current block;

predicting signs for the specific residual coefficients; and encoding residual information of the current block including syntax elements for the predicted signs, wherein a target syntax element among the syntax elements represents whether the predicted sign for the target syntax element is accurate, and wherein the scan order for the sign prediction is derived based on an intra prediction mode applied to the current block, wherein the selecting of the specific residual coefficients comprises calculating costs of the residual coefficients of the current block along the scan order, and selecting the specific residual coefficients for the sign prediction based on the costs of the residual coefficients, and wherein the costs of the residual coefficients are derived based on values of the residual coefficient and values of a template, corresponding to positions of the residual coefficients, for border samples of the current block.

11. The method of claim 10, wherein the specific residual coefficients are M residual coefficients of the scan order.

12. The method of claim 10, wherein the scan order is derived as a vertical scan order based on the intra prediction mode of the current block being a horizontal intra prediction mode, and wherein the scan order is derived as a horizontal scan order based on the intra prediction mode of the current block being a vertical intra prediction mode.

13. The method of claim 10, wherein the scan order is derived as a vertical scan order based on the intra prediction mode of the current block being one of specific horizontal directional intra prediction modes, the specific horizontal directional intra prediction modes are a HOR−HOR_OFFSET intra prediction mode to a HOR+HOR_OFFSET intra prediction mode, and a HOR intra prediction mode is a horizontal intra prediction mode, and wherein the scan order is derived as a horizontal scan order based on the intra prediction mode of the current block being one of specific vertical directional intra prediction modes, the specific vertical directional intra prediction modes are a VER−VER_OFFSET intra prediction mode to a VER+VER_OFFSET intra prediction mode, and a VER intra prediction mode is a vertical intra prediction mode.

14. A method for transmitting data for image, the method comprising:

obtaining a bitstream of image information including residual information including syntax elements for predicted signs of specific residual coefficients of a current block; and transmitting the data including the bitstream of the image information including the residual information, wherein a target syntax element among the syntax elements represents whether a predicted sign for the target syntax element is accurate, wherein the specific residual coefficients for sign prediction are selected as a scan order among residual coefficients of the current block, and wherein the scan order for the sign prediction is derived based on an intra prediction mode applied to the current block, wherein the selecting of the specific residual coefficients comprises calculating costs of the residual coefficients of the current block along the scan order, and selecting the specific residual coefficients for the sign prediction based on the costs of the residual coefficients, and wherein the costs of the residual coefficients are derived based on values of the residual coefficient and values of a template, corresponding to positions of the residual coefficients, for border samples of the current block.

* * * * *